United States Patent
Wizgall et al.

(10) Patent No.: US 7,377,251 B2
(45) Date of Patent: May 27, 2008

(54) V-ENGINE HAVING AT LEAST ONE TURBOCHARGER

(75) Inventors: Eberhard Wizgall, Illingen (DE); Urs Wenger, Rumisberg (CH); Ralf Centmayer, Frickingen (DE)

(73) Assignee: Weber Technology AG, Kusnacht (CH)

( * ) Notice: Subject to any disclaimer, the term of this patent is extended or adjusted under 35 U.S.C. 154(b) by 0 days.

(21) Appl. No.: 11/600,825

(22) Filed: Nov. 17, 2006

(65) Prior Publication Data

US 2007/0107424 A1    May 17, 2007

(30) Foreign Application Priority Data

Nov. 17, 2005    (DE) .................. 10 2005 056 508

(51) Int. Cl.
*F02B 61/04*    (2006.01)

(52) U.S. Cl. ................ 123/196 W; 123/195 P; 440/88 L; 440/88 C

(58) Field of Classification Search ............ 123/195 P, 123/196 W; 60/322, 323; 440/88 L, 88 C, 440/88 D, 88 HE See application file for complete search history.

(56) References Cited

U.S. PATENT DOCUMENTS

| | | | |
|---|---|---|---|
| 3,673,798 A * | 7/1972 | Kuehl .................. | 123/54.7 |
| 4,458,491 A * | 7/1984 | Deutschmann ............... | 60/323 |
| 4,554,892 A * | 11/1985 | Amemori et al. ........ | 123/195 P |
| 4,755,155 A * | 7/1988 | Blanchard .............. | 440/88 HE |
| 4,807,436 A * | 2/1989 | Deutschmann et al. ....... | 60/322 |
| 5,501,623 A * | 3/1996 | Bowen, III .................. | 440/80 |
| 2002/0173208 A1* | 11/2002 | Yonezawa et al. ............ | 440/88 |

* cited by examiner

*Primary Examiner*—Noah Kamen
(74) *Attorney, Agent, or Firm*—Shlesinger Arkwright & Garvey LLP

(57) ABSTRACT

The present invention relates to a V-engine (1) having at least one turbocharger (2) and at least two cylinders (4), which is constructed as a diesel engine and as an outboard motor for aquatic vehicles and wherein an exhaust gas system (6) leading from the minimum of two cylinders (4) to the minimum of one turbocharger (2) is arranged in the interior (8) of a V formed by the cylinders (4). A vertically arranged crankshaft (11), cylinder heads (19) which are designed to fold over, and coolant circuits supplied with sea water may also be provided in the V-engine (1).

18 Claims, 2 Drawing Sheets

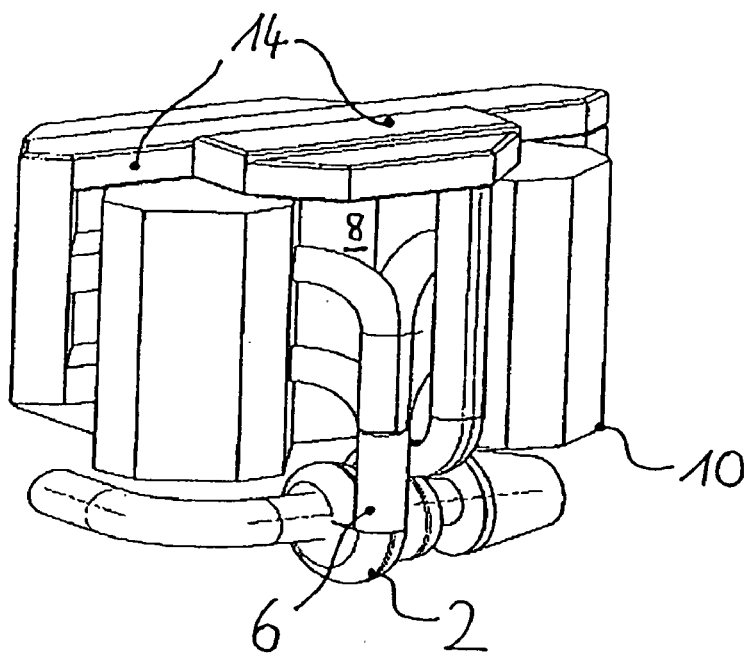
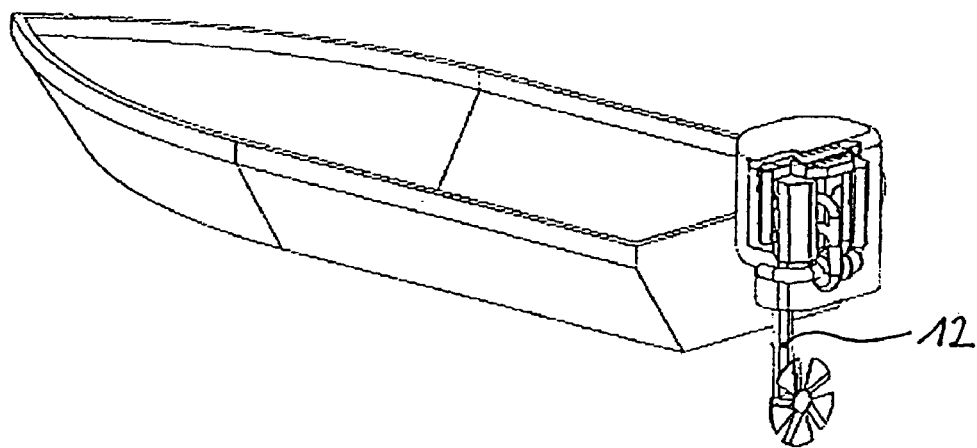

V-ENGINE HAVING AT LEAST ONE TURBOCHARGER

The present invention relates to a V-engine having at least one turbocharger and at least two cylinders, which is constructed as a diesel engine and as an outboard motor for aquatic vehicles.

Outboard motors for driving boats are generally known. They are typically attached to the stern of the boat with clamping screws and thereby differ from inboard motors, which are installed inside the boat.

It is desirable that outboard motors should have a high performance, low weight and the most dynamic driving characteristics possible, i.e. the motor should react immediately to control instructions. For this reason outboard motors for aquatic vehicles are conventionally designed as petrol-burning 4-stroke or 2-stroke Otto engines. The proportion of diesel outboard motors is less than one percent. One reason for this is the higher weight of the diesel engines compared with petrol engines of the same power. The higher weight usually results from the larger stroke volume and more complex materials. In addition, diesel engines often have less responsive driving characteristics than petrol engines, which makes them unsuitable for use as outboard motors.

On the other hand, there are factors which makes the use of diesel engines appear desirable. A diesel engine is distinguished from petrol engines by higher efficiency and a lower fuel consumption. In addition, the emission thresholds of the Lake Constance gas emissions Stage 2 could be met by a diesel outboard motor without any after-treatment of the exhaust gas.

Moreover, because of current fire regulations for large yachts, separate petrol stores on board are undesirable. As many large yachts carry a supply boat with an outboard motor, it would be advantageous if the outboard motor could be run on diesel. There would then be no need to carry additional petrol supplies, and the outboard motors could run on the same diesel fuel as the main drive of the yacht. In addition, the fuel costs for diesel are lower than for normal petrol.

There is thus a need for a diesel outboard motor for aquatic vehicles, which is not inferior to a petrol engine in its driving characteristics and which is characterised by the maximum possible power with low weight.

According to the invention, therefore, a V-engine having at least one turbocharger and at least two cylinders is proposed, which is constructed as a diesel engine and as an outboard motor for aquatic vehicles and wherein an exhaust gas system leading from the minimum of two cylinders to the minimum of one turbocharger is arranged inside a V formed by the cylinders.

In one embodiment of the invention the V-engine has two banks of cylinders each comprising an even number of cylinders. Preferably the banks of cylinders each comprise two cylinders. In the preferred embodiment it is therefore a V4 engine.

In a preferred embodiment of the invention each bank of cylinders has a cylinder head.

According to one feature of the invention the engine may be constructed as a 4-stroke engine. The 4-stroke principle gives the best efficiency levels together with good emission characteristics.

In a preferable embodiment of the invention, each cylinder head comprises outlet valves which are arranged so that an exhaust gas flows out in the direction of the inside of the V formed by the cylinders, and inlet valves which are arranged opposite the outlet valves so that a transverse flow of a supplied fuel is produced in the cylinders.

In a preferred embodiment of the invention the supply of fuel to the combustion chamber is effected by direct fuel injection.

A crankshaft may be arranged vertically if the motor is in its operating position. Preferably the V-engine comprises a shank surrounding the drive shaft, in which an oil circuit used to cool and lubricate the engine is constructed as a wet sump circuit and the wet sump is arranged in the shank.

In an alternative embodiment of the invention an oil circuit used to cool and lubricate the engine is constructed as a dry sump circuit.

There are preferably a number of turbochargers in the V-engine according to the invention. In one embodiment of the invention the turbochargers are arranged fluidically in series with one another. In another embodiment of the invention the turbochargers are arranged fluidically parallel to one another. Of course, it is also possible to have other mixed combinations of turbochargers.

According to a preferred feature of the V-engine according to the invention a cooling device is provided for cooling the air charge. Preferably, sea water is provided as the coolant in the cooling device.

According to a preferred feature of the invention another engine cooling circuit is provided for cooling engine components. This additional engine cooling circuit is preferably open. Sea water, for example, is provided as the coolant.

In one embodiment of the invention the engine cooling circuit is closed and a water heat exchanger supplied with sea water cools the coolant provided in the engine cooling circuit.

Preferably, the V-engine according to the invention has two secondary shafts driven by a crankshaft, each of which drives a camshaft mounted in one of the cylinder heads.

Preferably, the cylinder heads are symmetrical in construction, so that the two cylinder heads are identical components.

Further advantages and embodiments of the invention will become apparent from the description and the accompanying drawings.

It will be understood that the features mentioned above and those to be described hereinafter can be used not only in the particular combinations stated but also in other combinations or on their own without departing from the scope of the present invention.

The invention is schematically illustrated in the drawings by reference to an exemplifying embodiment and is described in more detail hereinafter with reference to the drawings.

FIG. 5 shows another perspective view of the V-engine according to the invention in a preferred embodiment of the invention.

FIG. 6 shows a perspective view of the V-engine according to the invention after installation.

Figure 1:
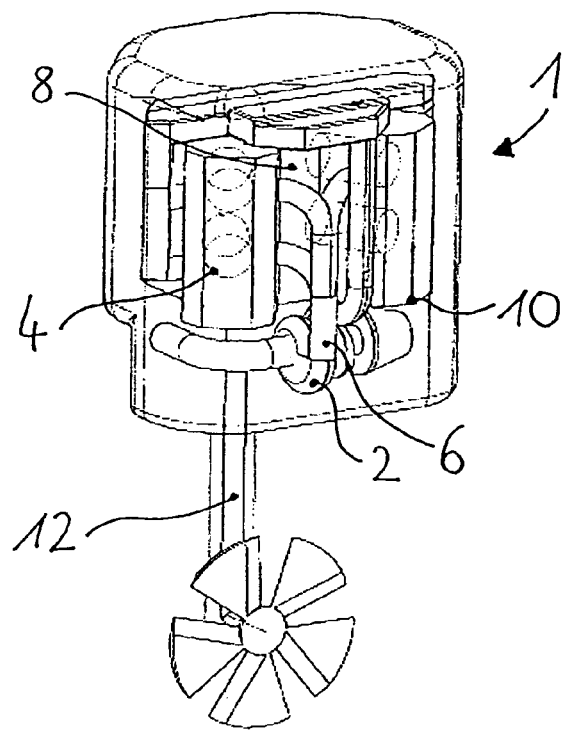
FIG. 1 shows an isometric overall view of the V-engine according to the invention in a preferred embodiment of the invention.
Figure 2:
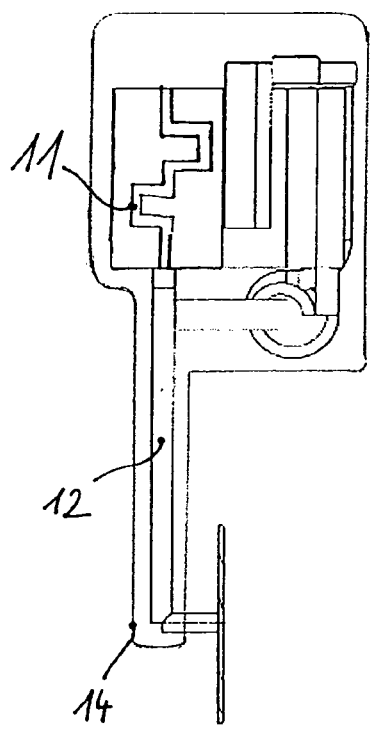
FIG. 2 shows a partial lateral cross-sectional view of the V-engine according to the invention in a preferred embodiment of the invention.

FIG. 1 shows the V-engine 1 according to the invention in a preferred embodiment. The engine 1 comprises a turbocharger 2, four cylinders 4, and exhaust gas system 6 which is arranged in the interior 8 of a V formed by the cylinders 4, two cylinder heads 10, one for each of the two banks of cylinders each consisting of two cylinders 4, and a drive shaft 12 coupled to a crankshaft 11, and surrounded by a shank 14, as shown in FIG. 2.

The engine 1 has four cylinders 4, which are arranged in two banks of cylinders, each comprising two cylinders 4. As can be seen from FIG. 3, the banks of cylinders are at an angle α to each other. According to the invention a diesel fuel is used as the fuel.

For each bank of cylinders, a cylinder head 10 is provided. The two cylinder heads 10 are identical components. In other words, one cylinder head 10 can also be installed in the opposite bank of cylinders rotated through 180°. The cylinder heads 10 can also be designed to fold over. Only the camshafts of the banks of cylinders differ from one another. A control chain (not shown) for controlling the camshaft is arranged in the center between the cylinders 4 of each bank of cylinders. Because of the further symmetrical construction of the cylinder heads 10 it is possible to use the same cylinder head 10 on both banks of cylinders. In addition to making assembly easier, this also significantly reduces the manufacturing costs of the engine 1, as there is no need to produce two different cylinder heads 10 and with them numerous individual components.

On each of the cylinders 4, the inlet and outlet valves (not shown) are located on opposite sides of the head such that the fresh and exhaust gas flow in cross-current. This arrangement allows unrestricted arrangement of the pipes and makes the pipes easier to seal. In addition, the cross-current has a beneficial effect on the combustion in the cylinders 4.

Figure 3:
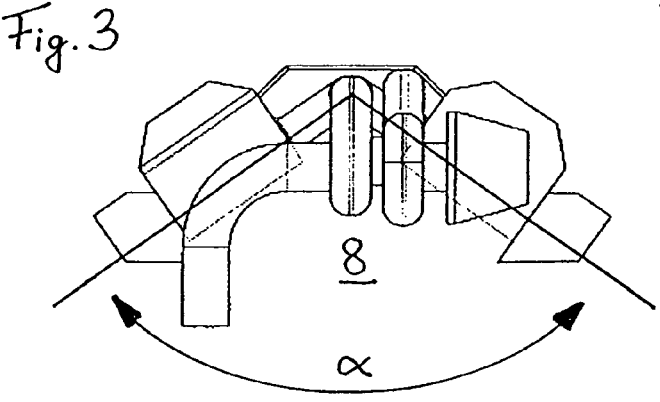
FIG. 3 shows a bottom view of the V-engine according to the invention, in which the V formed by the cylinders is clearly apparent.
Figure 4:
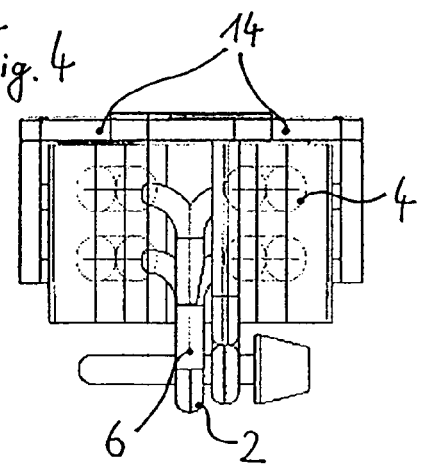
FIG. 4 shows a front view of the V-engine according to the invention in a preferred embodiment of the invention.

According to the invention the inlet and outlet sides of the cylinder head 10 are adapted to fit the available space. As a result, the exhaust gas system 6 can be accommodated in the interior 8 of the V. Accordingly, the supply lines 14 are provided on the opposite sides. The angle α in FIG. 3 is selected to be of such a size that the exhaust gas system 6 fits into the interior 8 of the V without any problems, as shown in FIGS. 4 and 5.

The exhaust gas system 6 opens into a turbocharger 2. Placing the turbocharger close to the engine results in a higher efficiency and better response characteristics of the turbocharger. To achieve a higher specific power, i.e. engine power in relation to engine weight, charging with a plurality of turbochargers is provided. These may be arranged in parallel or mixed in series. The turbocharger may take the form of a variable charger (i.e. as a VTG (variable turbine geometry) charger). In this type of turbocharger the build-up characteristics of the turbine can be continuously varied by the variable geometry in the turbine influx and in this way the exhaust gas energy can be used better.

There are two cooling circuits in the engine 1, one for cooling the air charge and one for cooling the engine 1. The air charge cooling circuit is operated with sea water as the coolant. The engine 1 is cooled with a twin-circuit cooling system. In the twin-circuit cooling system the so-called closed loop method is used. The closed cooling circuit of the engine 1 contains any desired coolant. This coolant is cooled by means of a water heat exchanger, which in turn uses sea water as coolant. However, it is also possible to have a construction with a single cooling circuit (open loop) in which sea water flows directly through the engine 1.

The known pump-line-nozzle (PLN) method is used as the injection system for injecting the diesel fuel. However, if desired, a different injection system may be used, such as the "common rail" method, for example.

The drive shaft 12 of the engine 1 stands vertically in the installed state of the motor 1, as shown in FIG. 6. It is surrounded by a shank 14. The lubrication of the engine 1 can therefore be carried out using the wet sump method. The wet sump is located in the shank 14. Alternatively, the engine 1 may, of course, also be lubricated by the dry sump method using an oil tank.

The features described hereinbefore result in a engine 1 which is of very compact construction. The power/weight ratio of the engine 1 is less than 1 kg/kW. The driving characteristics of the boat are thus not negatively affected by an excessively high engine weight or by too lower a power level. Compared with conventional petrol-driven outboard motors the torque is higher at lower engine speeds, resulting in a higher power reserve and better acceleration. The fuel consumption of the engine 1 according to the invention is far lower than that of a conventional petrol engine. At lower speeds the fuel consumption advantage is up to 35%.

Thus, the V-engine 1 according to the invention provides a diesel outboard motor for aquatic vehicles which is comparable with conventional petrol engines in terms of power/weight ratio, handling and fuel consumption and in some cases superior to them. It may thus be advantageously used for boats and other small aquatic vehicles.

The invention claimed is:

1. V-engine having at least one turbocharger and at least two cylinders which is constructed as a diesel engine and as an outboard motor for aquatic vehicles and wherein an exhaust gas system leading from the minimum of two cylinders to the minimum of one turbocharger is arranged in the interior of a V formed by the cylinders wherein the V-engine having a shank surrounding the drive shaft, wherein an oil circuit used for cooling and lubricating the engine is formed as a wet sump circuit and the wet sump is arranged in the shank.

2. V-engine according to claim 1, which has two banks of cylinders each comprising an even number of cylinders.

3. V-engine according to claim 2, wherein the banks of cylinders each comprise two cylinders.

4. V-engine according to claim 1 having a cylinder head for each bank of cylinders.

5. V-engine according to claim 4 wherein the construction of the cylinder heads is symmetrical, so that the two cylinder heads are identical components.

6. V-engine according to claim 1 which is constructed as a 4-stroke engine.

7. V-engine according to claim 1 wherein the fuel is supplied to the combustion chamber by direct injection.

8. V-engine according to claim 1 having a crankshaft which is arranged vertically when the motor is in its operating position.

9. V-engine according to claim 1 wherein an oil circuit used for cooling and lubricating the engine is formed as a dry sump circuit.

10. V-engine according to claim 1 wherein the plurality of turbochargers are provided.

11. V-engine according to claim 10, wherein the turbochargers are arranged fluidically in series with one another.

12. V-engine according to claim 10, wherein the turbochargers are arranged fluidically parallel to one another.

13. V-engine according to claim 1 wherein a cooling device is provided for cooling the air charge.

14. V-engine according to claim 13, wherein sea water is provided as coolant in the cooling device.

15. V-engine according to claim 1 wherein another engine cooling circuit is provided for cooling the engine components.

16. V-engine according to claim 15, wherein the additional engine cooling circuit is open and sea water is provided as the coolant.

17. V-engine according to claim 15, wherein the additional engine cooling circuit is closed and a water heat exchanger supplied with sea water cools the coolant provided in the additional engine cooling circuit.

18. V-engine according to claim 1 which comprises two secondary shafts driven by a crankshaft, which drive at least one camshaft mounted in one of the cylinder heads.

* * * * *